(12) United States Patent
Lee

(10) Patent No.: US 12,469,932 B2
(45) Date of Patent: Nov. 11, 2025

(54) ENERGY STORAGE DEVICE

(71) Applicant: James Cheng Lee, La Habra, CA (US)

(72) Inventor: James Cheng Lee, La Habra, CA (US)

(*) Notice: Subject to any disclaimer, the term of this patent is extended or adjusted under 35 U.S.C. 154(b) by 528 days.

(21) Appl. No.: 18/104,386

(22) Filed: Feb. 1, 2023

(65) Prior Publication Data
US 2024/0258654 A1 Aug. 1, 2024

(51) Int. Cl.
*H01M 50/507* (2021.01)
*H01M 50/204* (2021.01)
*H01M 50/264* (2021.01)

(52) U.S. Cl.
CPC ....... *H01M 50/507* (2021.01); *H01M 50/204* (2021.01); *H01M 50/264* (2021.01)

(58) Field of Classification Search
CPC . H01M 50/507; H01M 50/264; H01M 50/204
USPC ........................................................ 429/163
See application file for complete search history.

(56) References Cited

U.S. PATENT DOCUMENTS

2016/0211499 A1* 7/2016 Cho .................... H01M 50/264
2023/0327271 A1* 10/2023 Koetting .............. H01M 50/211
429/159

* cited by examiner

*Primary Examiner* — Allison Bourke
*Assistant Examiner* — Robert Gene West

(57) ABSTRACT

The invention discloses an energy storage device, comprising: a housing provided with at least one connector; and a battery module arranged in the housing, the battery module including: a plurality of batteries; a battery rack accommodating the plurality of batteries; at least one bus arranged on a surface of the battery rack and connected to the plurality of batteries; at least one connecting rod connected between the bus and the connector; and at least one insulator sheathed onto the connecting rod. The insulator is provided with a bridging portion, two side pieces, and two inward protrusion portions. An opening end is formed between ends of the two side pieces. The connecting rod passes through the opening end and is sheathed by the insulator. Therefore, the battery module of the present invention has low cost and simple design.

4 Claims, 6 Drawing Sheets

ENERGY STORAGE DEVICE

BACKGROUND OF THE INVENTION

1. Field of the Invention

The present invention relates to an energy storage device, in particular to low-cost and simplistic energy storage device.

2. The Prior Arts

For the energy storage devices on the market, regarding the installation of battery modules and the series-parallel connection of batteries, most of the internal insulation methods use wires with their own outer covers, or use heat-shrinkable sleeves for insulation protection. However, the total cost of wire insulation is relatively high, and heat-shrinkable sleeve insulation requires additional heat-shrinking procedures, and the process is relatively complicated.

Therefore, it is necessary to provide an energy storage device with low cost and a simple design.

SUMMARY OF THE INVENTION

The objective of the present invention is to provide an energy storage device, comprising: a housing provided with at least one connector; and a battery module arranged in the housing, the battery module including: a plurality of batteries; a battery rack accommodating the plurality of batteries; at least one bus arranged on a surface of the battery rack and connected to the plurality of batteries; at least one connecting rod connected between the bus and the connector; and at least one insulator sheathed onto the connecting rod. The insulator is provided with a bridging portion, two side pieces, and two inward protrusion portions. Two ends of the bridging portion respectively extend to form the two side pieces. The two side pieces are arranged to be opposite to each other. The two side pieces are provided with the two inward protrusion portions. The two inward protrusion portions are arranged to be opposite to each other. An opening end is formed between ends of the two side pieces. The connecting rod passes through the opening end and is sheathed by the insulator. The bridging portion and the two inward protrusion portions are respectively arranged on an outer surface and an inner surface of the connecting rod. The two side pieces are respectively arranged on an upper surface and a lower surface of the connecting rod.

Alternatively, the housing is provided with a positive connector and a negative connector, the battery module is provided with two of the buses, and two of the connecting rods are respectively connected between the positive connector and one of the two buses and between the negative connector and another one of the two buses.

Alternatively, the inner surfaces of the two connecting rods are arranged to face each other, the inner surface and the outer surface are arranged to be opposite, the upper surface and the lower surface which are opposite are connected between the inner surface and the outer surface, the two connecting rods are sheathed with two of the insulators, and the opening ends of the two insulators are arranged to face each other.

Alternatively, each bus is provided with a connection portion, the connection portion is provided with a first positioning hole penetrating through an upper surface and a lower surface of the connection portion, two ends of the connecting rod are respectively provided with a second positioning hole penetrating through the upper surface and the lower surface of the connecting rod, the positive connector and the negative connector are both provided with a third positioning hole, the second positioning holes at the two ends of the connecting rod are respectively connected to the first positioning hole and the third positioning hole by a screw.

DETAILED DESCRIPTION OF THE PREFERRED EMBODIMENT

In order to describe in detail the technical content, structural features, achieved purpose and effect of the energy storage device 100 of the present invention, the following examples are given to describe the embodiments in conjunction with the drawings.

Figure 1:
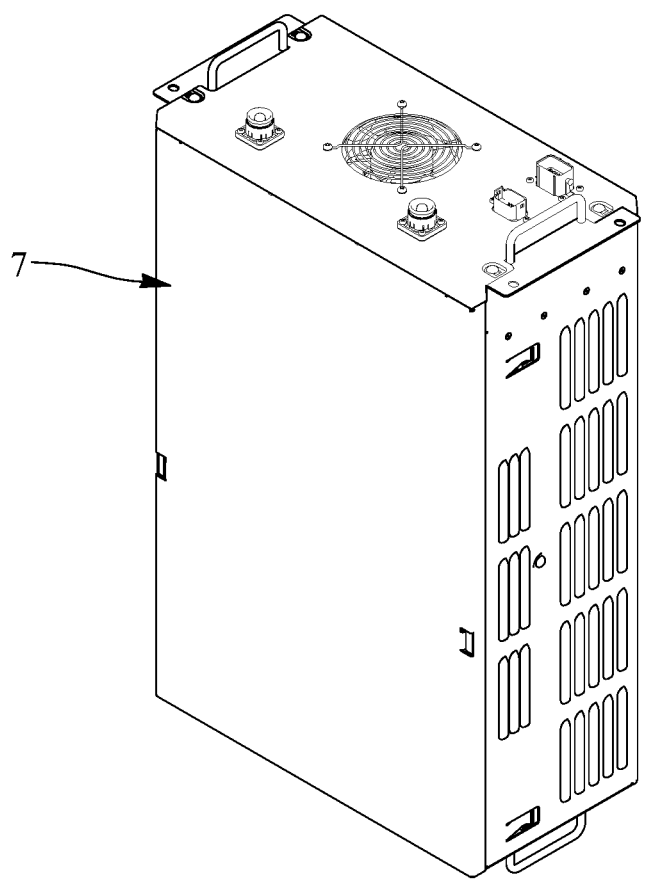
FIG. 1 is a perspective view of an energy storage device of the present invention.
Figure 2:
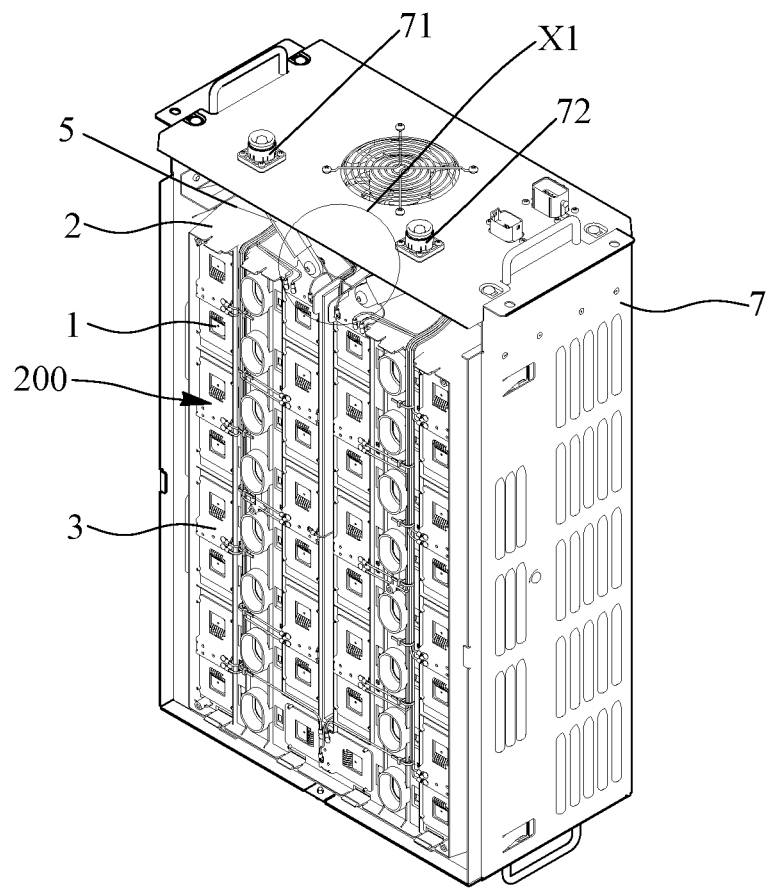
FIG. 2 is a partial perspective view of the energy storage device of the present invention.
Figure 3:
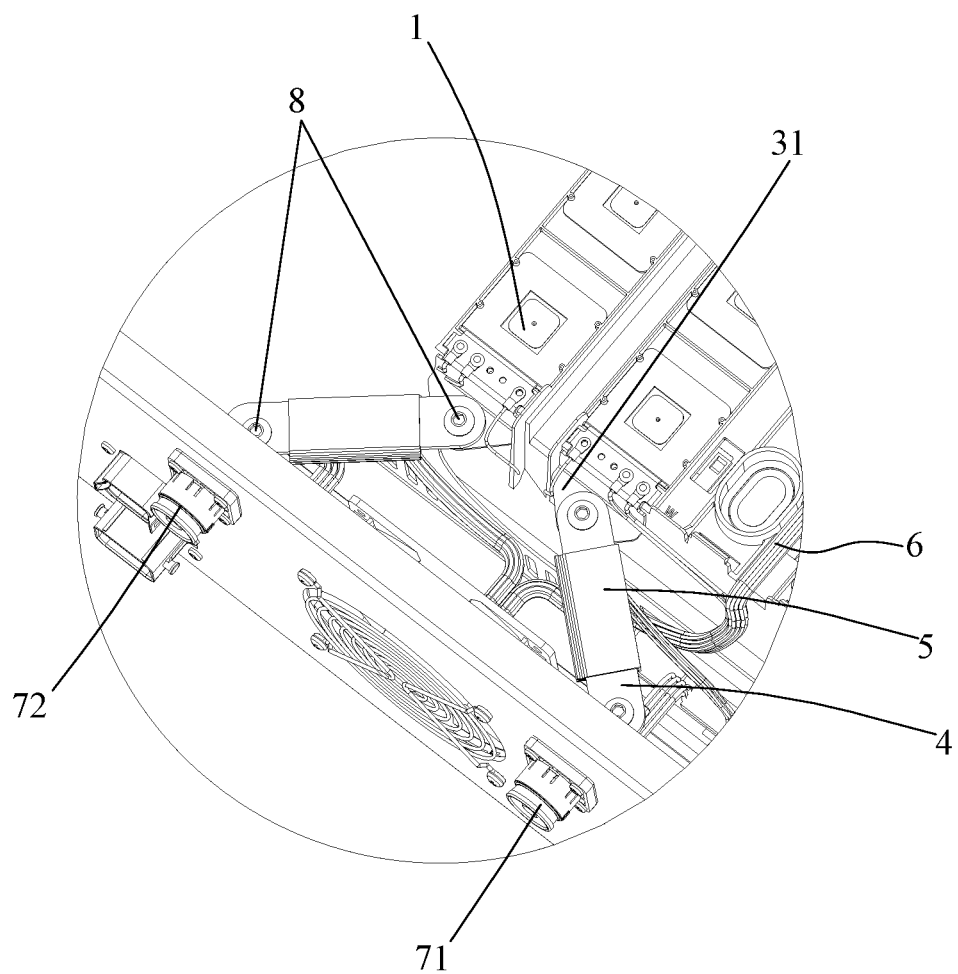
FIG. 3 is a partial enlargement cross-sectional view taken along line X1 of FIG. 2 of the energy storage device of the present invention.

Referring to the FIGS. 1-3, the energy storage device 100 of the present invention includes a housing 7, and the housing 7 is provided with a positive connector 71 and a negative connector 72. A battery module 200 is disposed inside the housing 7, and the battery module 200 includes a plurality of batteries 1, a battery rack 2, a plurality of buses 3, and a plurality of detection lines 6. The positive connector 71 and the negative connector 72 are connected to the plurality of buses 3 of the battery module 200 through two connecting rods 4, and two insulators 5 are sheathed onto the outer surfaces of the two connecting rods 4.

The plurality of batteries 1 are fixed into the battery rack 2, and the plurality of buses 3 are arranged on the upper surface of the battery rack 2. The plurality of buses 3 are used to connect the plurality of batteries 1 in series or in parallel. One end of the connecting rod 4 is connected to the bus 3, and the other end of the connecting rod 4 is connected to the positive connector 71 or the negative connector 72 of the housing 7. The insulator 5 is sheathed onto the connecting rod 4. The plurality of the detection lines 6 are arranged on the upper surface of the battery rack 2 for transmitting temperature detection signals and pressure detection signals. The housing 7 is disposed outside the plurality of batteries 1, the battery rack 2, the plurality of buses 3, the two connecting rods 4, the two insulators 5, and the plurality of detection lines 6.

Referring to the FIGS. 3-6, the insulator 5 is sheathed onto the connecting rod 4. The insulator 5 has an opening end 50, a bridging portion 51, two side pieces 52, and two inward protrusion portions 53. Both ends of the bridging portion 51 extend upwards to form the side pieces 52. The side pieces 52 extend upwards and then bend inwards to form the inward protrusion portions 53. The two inward protrusion portions 53 are disposed opposite to each other, and the opening end 50 is formed between the ends of the two inward protrusion portions 53. The bridging portion 51 is arranged on the outer surface of the connecting rod 4, the two side pieces 52 are respectively arranged on the upper surface and the lower surface of the connecting rod 4, and the two inward protrusion portions 53 are arranged on the inner surface of the connecting rod 4, so that the energy storage device 100 of the present invention has the effect of insulation protection. In the present embodiment, the insulator 5 can withstand a voltage of 600 volts. In the present embodiment, the material of the insulator 5 is polyvinyl chloride, but is not limited thereto. In the present embodiment, the opening ends 50 of the two insulators 5 face each other to avoid the risk of tripping in the energy storage device 100 of the present invention.

In the present embodiment, the length of the bridging portion 51 is equal to or more than 59.5 mm and equal to or less than 60.5 mm. The width of the bridging portion 51 is equal to or more than 6.1 mm and equal to or less than 6.2 mm. The thickness of the bridging portion 51 is equal to or more than 0.95 mm and equal to or less than 1.05 mm.

In the present embodiment, the length of the side piece 52 is equal to or more than 59.5 mm and equal to or less than 60.5 mm. The width of the side piece 52 is 1 mm. The height of the side piece 52 is equal to or more than 23.5 mm and equal to or less than 24.1 mm.

In the present embodiment, the total length of the inward protrusion portion 53 and the side piece 52 is equal to or more than 29.44 mm and equal to or less than 30.44 mm.

In the present embodiment, the two ends of the bridging portion 51 are respectively extended inwardly by one degree to form the two side pieces 52, and the specific implementation is not limited thereto. The shortest distance between the two inward protrusion portions 53 is equal to or more than 0 mm and equal to or less than 0.2 mm. The distance between the outer top ends of the two inward protrusion portions 53 is equal to or more than 3.85 mm and equal to or less than 4.45 mm.

Figure 4:
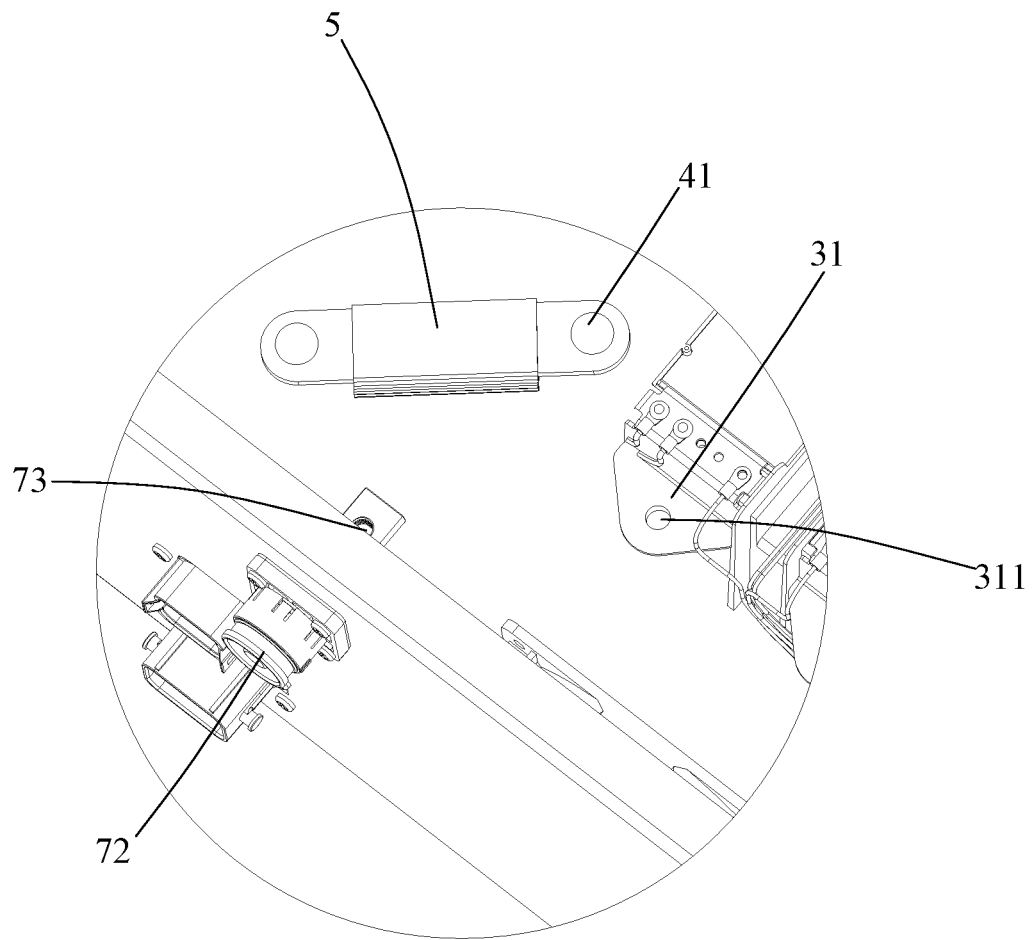
FIG. 4 is a partial exploded view of the energy storage device of the present invention.
Figure 5:
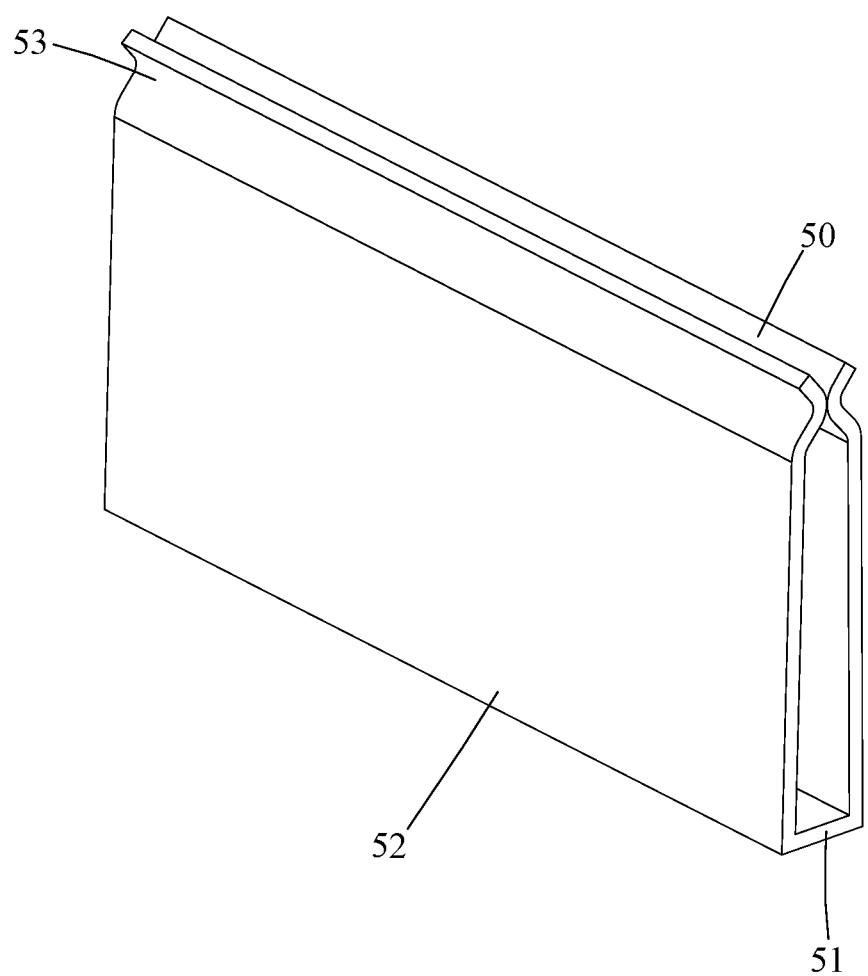
FIG. 5 is a perspective view of an insulator of the energy storage device of the present invention.
Figure 6:
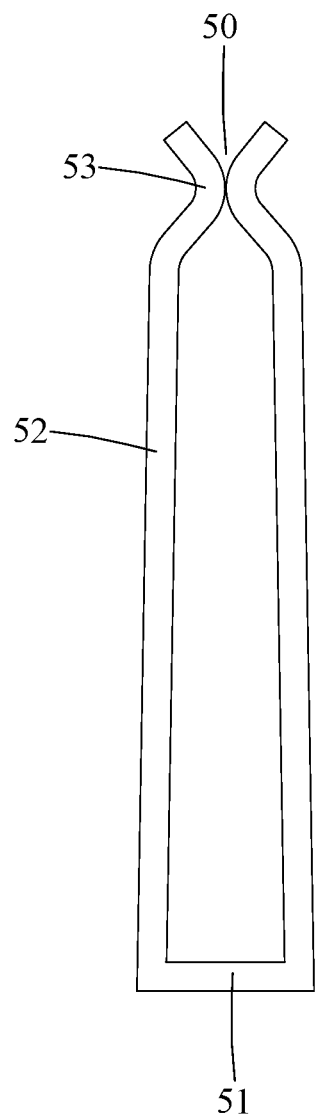
FIG. 6 is a side view of the insulator of the energy storage device of the present invention.

Referring to the FIGS. 2-4, the bus 3 is provided with a connection portion 31; the connecting rod 4 is connected to the connection portion 31, and is electrically connected to the positive connector 71 and the negative connector 72 of the housing 7. The connection portion 31 is provided with a first positioning hole 311 that penetrates the upper and lower surfaces of the connection portion 31, and the two ends of the connecting rod 4 are respectively provided with a second positioning hole 41 that penetrates the upper and lower surfaces of the connecting rod 4. The second positioning hole 41 positioned at one end of the connecting rod 4 corresponds to the first positioning hole 311 of the connection portion 31, and a screw 8 is used to lock the first positioning hole 311 and the second positioning hole 41, to realize the positioning and fixing between the connecting rod 4 and the bus 3. Both the positive connector 71 and the negative connector 72 are provided with a third positioning hole 73, the second positioning hole 41 positioned at the other end of the connecting rod 4 corresponds to the third positioning hole 73, and the screw 8 is used to lock the second positioning hole 41 and the third positioning hole 73, to realize the positioning and fixing between the connecting rod 4 and the housing 7. Thus, the connecting rod 4 is connected between the bus 3 and the housing 7.

The two connecting rods 4 respectively have the inner surfaces facing each other, the outer surfaces opposite to the inner surfaces, and the upper surfaces and the lower surfaces opposite to each other and connected between the inner surfaces and the outer surfaces.

In summary, the energy storage device 100 of the present invention avoids the risk of tripping by using the two insulators 5 sheathed onto the two connecting rods 4, and by positioning the two opening ends 50 to be opposite to each other. The bridging portion 51 is arranged on the outer surface of the connecting rod 4, the two side pieces 52 are respectively arranged on the upper surface and the lower surface of the connecting rod 4, and the two inward protrusion portions 53 are arranged on the connecting rod 4, thus, the two opening ends 50 of the two insulators 5 face each other, so that the energy storage device 100 of the present invention has the effect of insulation protection, and so that the energy storage device 100 of the present invention has low cost and simple design.

What is claimed is:

1. An energy storage device, comprising:
   a housing provided with at least one connector; and
   a battery module arranged in the housing, the battery module including:
   a plurality of batteries;
   a battery rack accommodating the plurality of batteries;
   at least one bus arranged on a surface of the battery rack and connected to the plurality of batteries;
   at least one connecting rod connected between the bus and the connector; and
   at least one insulator sheathed onto the connecting rod,
   wherein the insulator is provided with a bridging portion, two side pieces, and two inward protrusion portions, two ends of the bridging portion respectively extend to form the two side pieces, the two side pieces are arranged to be opposite to each other, the two side pieces are provided with the two inward protrusion portions, the two inward protrusion portions are arranged to be opposite to each other, an opening end is formed between ends of the two side pieces, the connecting rod passes through the opening end and is sheathed by the insulator, the bridging portion and the two inward protrusion portions are respectively arranged on an outer surface and an inner surface of the connecting rod, and the two side pieces are respectively arranged on an upper surface and a lower surface of the connecting rod.

2. The energy storage device according to claim 1, wherein, the housing is provided with a positive connector and a negative connector, the battery module is provided with two of the buses, and two of the connecting rods are respectively connected between the positive connector and one of the two buses and between the negative connector and another one of the two buses.

3. The energy storage device according to claim 2, wherein, the inner surfaces of the two connecting rods are arranged to face each other, the inner surface and the outer surface are arranged to be opposite, the upper surface and the lower surface which are opposite are connected between the inner surface and the outer surface, the two connecting rods are sheathed with two of the insulators, and the opening ends of the two insulators are arranged to face each other.

4. The energy storage device according to claim 3, wherein, each bus is provided with a connection portion, the connection portion is provided with a first positioning hole penetrating through an upper surface and a lower surface of the connection portion, two ends of the connecting rod are respectively provided with a second positioning hole penetrating through the upper surface and the lower surface of the connecting rod, the positive connector and the negative connector are both provided with a third positioning hole, the second positioning holes at the two ends of the connecting rod are respectively connected to the first positioning hole and the third positioning hole by a screw.

* * * * *